(12) United States Patent
Sasaki et al.

(10) Patent No.: US 6,806,667 B1
(45) Date of Patent: Oct. 19, 2004

(54) CONTROL UNIT AND CONTROL METHOD FOR CONTROLLING VIBRATION OF AN ELECTRIC VEHICLE

(75) Inventors: Shoichi Sasaki, Okazaki (JP); Yoshiaki Ito, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/444,134

(22) Filed: May 23, 2003

(51) Int. Cl.⁷ .............................................. H02P 7/00
(52) U.S. Cl. ...................... 318/432; 318/433; 318/434; 180/170
(58) Field of Search ................................ 318/432, 433, 318/434; 180/170

(56) References Cited

U.S. PATENT DOCUMENTS

| | | | | |
|---|---|---|---|---|
| 5,467,275 A | * | 11/1995 | Takamoto et al. | 701/70 |
| 5,467,363 A | * | 11/1995 | Okabayashi | 372/38.02 |
| 5,610,483 A | * | 3/1997 | Obara et al. | 318/139 |
| 5,726,890 A | * | 3/1998 | Takamoto et al. | 701/70 |
| 5,964,509 A | * | 10/1999 | Naito et al. | 303/112 |
| 6,194,850 B1 | * | 2/2001 | Kumar et al. | 318/52 |

FOREIGN PATENT DOCUMENTS

| | | |
|---|---|---|
| JP | 9 294307 | 11/1997 |
| JP | 11-44229 | 2/1999 |
| JP | 2000-217209 | 8/2000 |

* cited by examiner

*Primary Examiner*—Rita Leykin
(74) *Attorney, Agent, or Firm*—Kenyon & Kenyon (57) ABSTRACT

A control unit of the present invention for an electric vehicle capable of being driven using torque from an electric motor generated in response to a torque instruction, comprising an electric motor rotation speed detection and estimation unit for detecting or estimating rotation speed of the electric motor, a drive wheel rotation speed detection and estimation unit for detecting or estimating rotation speed of drive wheels, and a torque instruction compensation unit. The torque instruction compensation unit compensates the torque instruction so as to control vibration of the vehicle based on rotational speed of the electric motor detected or estimated by the electric motor rotation speed detection and estimation unit and drive wheel rotation speed detected or estimated by the drive wheel rotation speed detection and estimation unit.

20 Claims, 12 Drawing Sheets

CONTROL UNIT AND CONTROL METHOD FOR CONTROLLING VIBRATION OF AN ELECTRIC VEHICLE

BACKGROUND OF THE INVENTION

1. Field of the Invention

The present invention relates to a control unit and a control method for an electric vehicle, and in more detail, relates to a control unit for an electric vehicle capable of being driven using at least torque from an electric motor.

2. Related Art

As a control unit for an electric vehicle, in an electric vehicle that travels under torque from an electric motor, there has been proposed a device for controlling vibration of a vehicle using feed-forward control taking into consideration disturbance torque (for example, Japanese Patent Laid-open No. 2000-217209). This device is provided with a plant model having a transfer function that approximates to the transfer function of an actual plant, feed forward control means using an inverse function of this plant model transfer function to set electric motor torque, and inputting the set torque to an actual plant side and to the plant model, and compensation means for estimating disturbance torque based on a deviation between an output value of the actual plant and an output value of the plant model, and compensating electric motor torque input to the actual plant side from the feed forward control means using this estimated disturbance torque, and unavoidable disturbance torque that can not be removed by feed forward control is removed using the plant model.

However, with this type of electric vehicle control unit, feed back control is also carried out, in addition to feed forward control, which means that the amount of processing required to carry out control becomes significant, and it is not possible to use a CPU that has a slow operation speed.

Further, application of this control device is limited to vehicles that travel under torque from an electric motor, which means that in the case of application of control to suppress vibration to a hybrid vehicle traveling under torque from an internal combustion engine and an electric motor, torque output from the internal combustion engine will incorrectly be processed as disturbance torque. Thus it is not possible to suppress vibration induced by the torque output from the internal combustion engine.

SUMMARY OF THE INVENTION

One advantage of the electric vehicle control unit and control method of the present invention is that there is control of vibration accompanying vehicle torque variation regardless of whether of not there is an internal combustion engine. Another advantage of the electric vehicle control unit and control method of the present invention is that there is control of vibration accompanying variation in vehicle torque using control that requires a reduced amount of computation.

The electric vehicle control unit and control method of the present invention have the following means in order to achieve at least some of the above described advantages.

A control unit of the present invention for an electric vehicle capable of being driven using at least torque from an electric motor comprises electric motor rotation speed detection and estimation means for detecting or estimating rotation speed of the electric motor, drive wheel rotation speed detection and estimation means for detecting or estimating rotation speed of drive wheels, and torque instruction compensation means for compensating an electric motor torque instruction so as to control vibration of the vehicle based on rotational speed of the electric motor detected or estimated by the electric motor rotation speed detection and estimation means and drive wheel rotation speed detected or estimated by the drive wheel rotation speed detection and estimation means.

With this electric vehicle control unit of the present invention, vehicle vibration is suppressed by compensating the electric motor torque command based on detected or estimated electric motor rotation speed and drive wheel rotation speed. Since this is control with calculation using electric motor rotation speed and drive wheel rotation speed, it is possible to reduce the amount of computation required for control compared to using control that carried out feedback control in addition to feed forward control. As a result, it is possible to use a CPU with a slow operation speed.

In this type of electric vehicle control unit of the present invention, it is also possible for the torque instruction compensation means to have means for compensating the torque by subtracting a compensation value obtained by multiplying a rotational speed difference between derived rotational speed of the drive wheels derived from detected or estimated electric motor rotation speed, and the detected or estimated drive wheel rotation speed, by a specified gain, from the torque instruction. In the electric vehicle control unit of this aspect of the present invention, the specified gain can be determined so that poles of a characteristic equation for a pair of simultaneous equations, namely an equation of motion for the drive system of the electric vehicle described above, with the electric motor rotational speed, the drive wheel rotational speed and a drive shaft twist angle as variables, and an equation of state for the control system using the above described electric motor input torque obtained by subtracting the rotational speed deviation, multiplied by the gain, from the torque instruction, become real numbers.

Also, in the electric vehicle control unit of the present invention, it is possible for the drive wheel rotation speed detection and estimation means to have means for estimating rotational speed of the drive wheels based on at least the electric motor rotation speed and the compensated torque command input to the control system.

Further, in the electric vehicle control unit of the present invention, it is possible for the electric motor rotation speed detection and estimation means to have means for estimating the electric motor rotation speed based on the electric motor rotation speed detected at low resolution, and the compensated torque command input to the control system.

Alternatively, it is possible, in the electric vehicle control unit of the present invention, to provide disturbance estimation means for estimating disturbance based on a torque command compensated by the torque command compensation means, a derived rotational speed of the drive wheels derived from detected or estimated rotation speed of the electric motor, and a detected or estimated drive wheel rotation speed, and it is possible for the torque instruction compensation means to be compensation means for compensating the torque instruction based on disturbance estimated by the disturbance estimation means. In this way, it is possible to effectively suppress vehicle vibrations due to disturbance.

In a control unit for a hybrid electric vehicle of the present invention capable of being driven using torque from an internal combustion engine having an aspect for estimating rotation speed of drive wheels and rotation speed of an electric motor, there is provided output torque estimation means for estimating output torque of the internal combustion engine, and it is possible for the drive wheel rotation speed detection and estimation means to have means for estimating drive wheel rotation speed based on output torque estimated by the output torque estimation means.

In the electric vehicle control unit of the present invention having an aspect where drive rotation speed is rotated based on the estimated internal combustion engine output torque, it is possible for the electric motor rotation speed detection and estimation unit to have means for estimating electric motor rotation speed based on output torque estimated by the output torque estimation means.

In the electric vehicle control unit of the present invention having an aspect where disturbance estimation means is provided and drive wheel rotation speed is estimated based on estimated internal combustion engine output torque, it is possible for the disturbance estimation means to have means for estimating disturbance based on output torque estimated by the output torque estimation means.

A control method for an electric vehicle of the present invention, being a control method for an electric vehicle capable of being driven using torque from at least an electric motor, comprises the steps of:

(a) detecting or estimating electric motor rotation speed and drive wheel rotation speed; and (b) compensating a torque command for the electric motor so as to suppress vehicle vibration based on the detected or estimated electric motor rotation speed and drive wheel rotation speed.

With the electric vehicle control method of the present invention, it is possible to suppress vehicle vibration by compensating an electric motor torque command based on detected or estimated electric motor rotation speed and drive wheel rotation speed. Also, since control involves computation using the electric motor rotation speed and drive wheel rotation speed, it is possible to reduce the amount of computation required for control compared to control where feedback control is carried out in addition to feed forward control. It is therefore possible to carry out control using a CPU with a slow operation speed.

In the control method for an electric vehicle of the present invention, it is possible for step (b) to be a step of compensating the torque instruction by subtracting a compensation value, obtained by multiplying a rotational speed deviation between appropriate speed of detected or estimated rotational speed of the electric motor appropriate for the drive wheels and detected or estimated drive wheel rotational speed by a specified gain, from the torque instruction. In this aspect of the electric vehicle control method of the present invention, it is possible for step (b) to be a step of using the gain determined so that poles of a characteristic equation for an equation of state for the control system using an equation of motion for the drive system of the electric vehicle described above, with the electric motor rotational speed, the drive wheel rotational speed and a drive shaft twist angle as variables, and the above described electric motor input torque obtained by subtracting the rotational speed deviation, multiplied by the gain from the torque instruction, become real numbers, as the specified gain.

DESCRIPTION OF PREFERRED EMBODIMENTS

Figure 1:
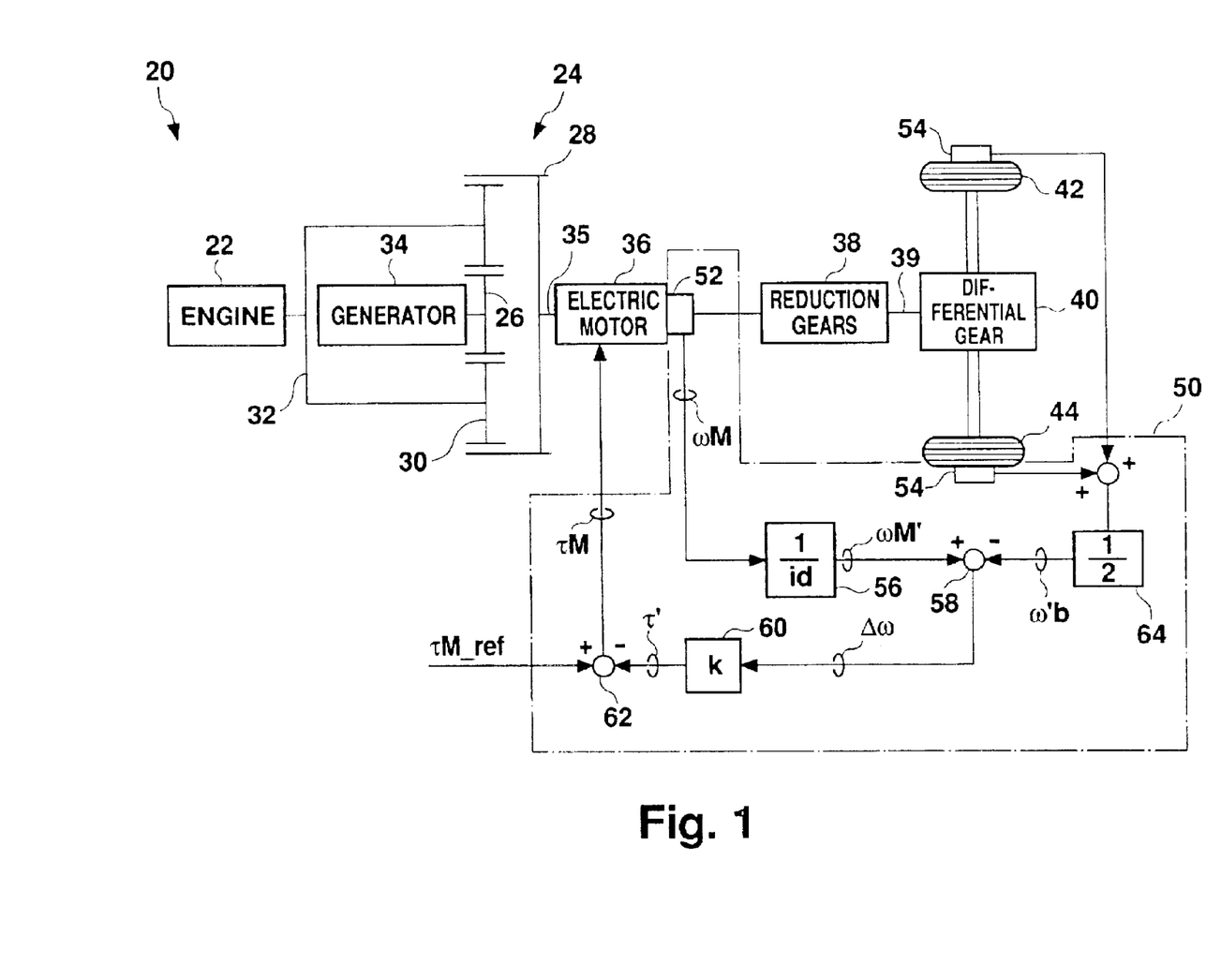
FIG. 1 is a schematic diagram showing the structure of an electric vehicle 20 fitted with a control device 50 for an electric vehicle of one embodiment of the present invention.

Preferred embodiments of the present invention will now be described. FIG. 1 is a schematic diagram showing the structure of an electric vehicle 20 fitted with a control device 50 for an electric vehicle of one embodiment of the present invention. As shown in the drawing, the electric vehicle 20 of this embodiment comprises an engine 22, a planetary gear 24 for inputting drive force from the engine 22 to a planetary carrier 32 made up of a chain of a plurality of planetary pinion gears 30, a generator 34 connected to a sun gear 26 of the planetary gear 24, an electric motor 36 using a rotating shaft 35 connected to a ring gear 28 of the planetary gear 24 as an output shaft, a reduction gear 38 for reducing the rotational speed of the rotating shaft 35 to the rotational speed of a drive shaft 39, drive wheels 42 and 44 connected through a differential gear 40 to the drive shaft 39, and the electric vehicle controller 50 of this embodiment for carrying out torque control of the electric motor 36. With this embodiment, the generator 34 and an electric motor 36 capable of generating power are used.

The electric vehicle controller 50 of this embodiment comprises an electric motor rotation speed sensor 52 for detecting the rotational speed $\omega M$ of the electric motor 36, a drive wheel rotational speed sensor 54 for detecting the rotational speed of the drive wheels 42 and 44, a drive wheel rotational speed converter 64 for converting to average rotational speed $\omega b$ of the drive wheels 42 and 44 detected by the rotational speed sensor 54, an drive wheel rotational speed derivation unit 56 for dividing rotational speed ωM of the electric motor 36 detected by the electric motor rotational speed sensor 52 by a reduction ratio id of the reduction gear 38 to obtain derived rotational speed ωM' from the rotational speed ωM of the electric motor 36 for the drive wheels 42 and 44, a first subtractor 58 for subtracting average rotational speed ωb of the drive wheels 42 and 44 detected by the drive wheels rotational speed sensor 54 from the derived rotational speed ωM' to calculate a rotational speed deviation Δω, a multiplier 60 for multiplying the rotational speed deviation Δω by gain k to calculate a compensation value τ', and a second subtractor 62 for subtracting the compensation value τ' from a torque command τM_ref to calculate an input torque τM input to the electric motor 36. Within the structure of the control device 50 for an electric vehicle, each of the sections, except for the electric motor rotation speed sensor 52 and the drive wheel rotational speed sensor 54, are described as a control block, and the CPU, comprised of a microprocessor, is central to the hardware structure.

The gain k of the multiplier 60 is set to a value determined from equation (1) so as to suppress vibration. With this embodiment, among gains for suppressing vibration set using equation (2) a value giving the fastest response is used as the gain k. In equation (1) and equation (2), J1 is moment of inertia of the electric motor including consideration of the moment of inertia of the engine 22 connected to the planetary gear 24 and of the generator 34, J2 is a sum of equivalent moment of inertia of the vehicle etc. and equivalent moment of inertia of tires, Cs is a value that combines coefficient of viscosity of a shaft 39 of the drive system and the tires, and Ks is a value that combines spring constant of the shaft 39 of the drive system and the tires.

$$k \geq \frac{a11 - a21 + 2\sqrt{a23 - a13}}{b1} \tag{1}$$

Here, $$a11 = -\frac{C_s}{J1id^2} \tag{2}$$

$$a13 = \frac{K_s}{J1id^2}$$

$$a21 = \frac{C_s}{J2}$$

$$a23 = \frac{K_s}{J2}$$

$$b1 = \frac{1}{J1id^2}$$

$$k = \frac{a11 - a21 + 2\sqrt{a23 - a13}}{b1}$$

Figure 2:
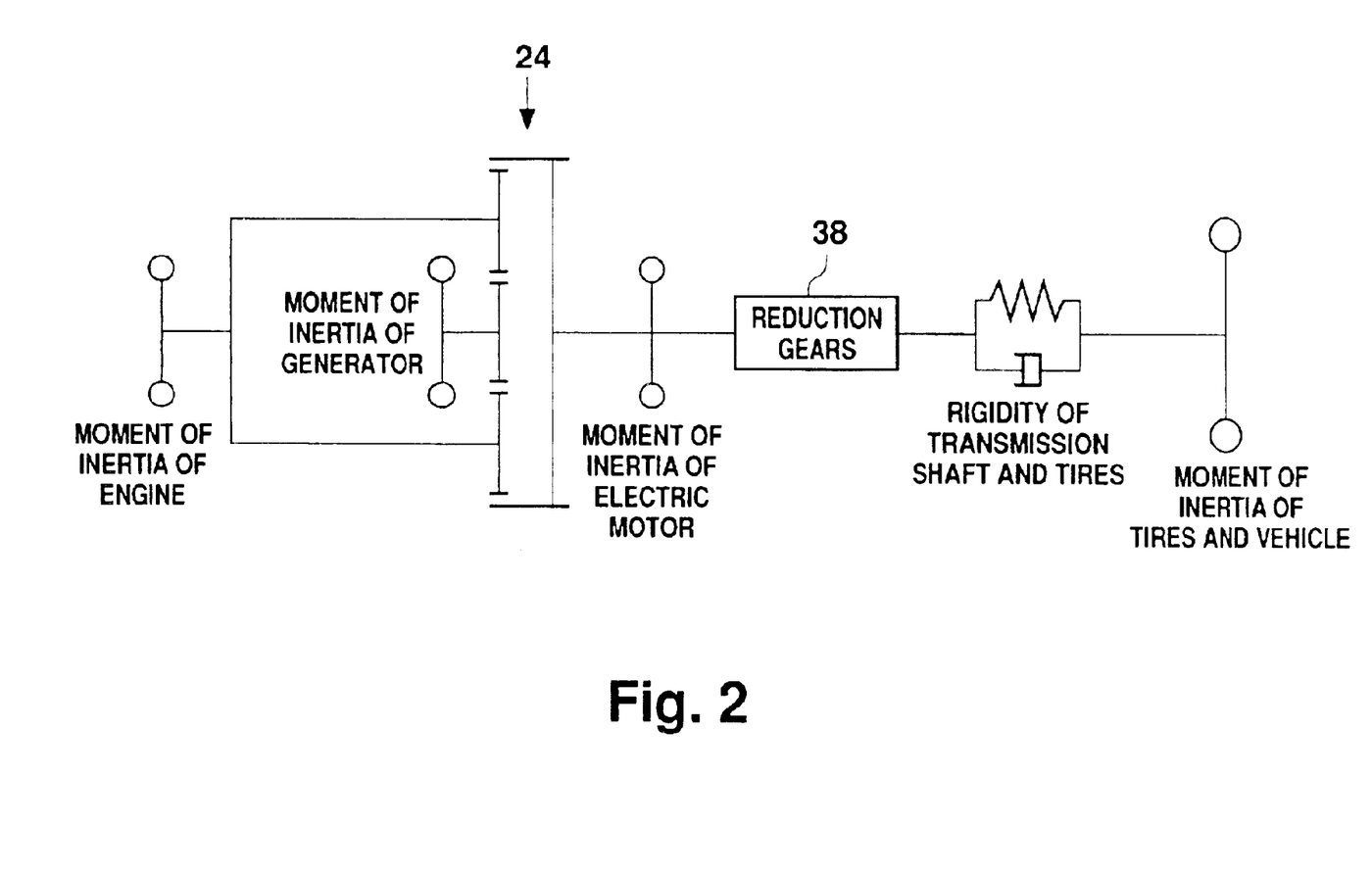
FIG. 2 is a drawing showing one example of a model for design of a control system of the electric vehicle 20.

The reason it is possible to suppress vehicle vibration using the gain k obtained from equation (1) and equation (2) is as follows. First of all, as the model for designing the control system for the electric vehicle 20 of this embodiment, rigidity of the drive system shaft 39 and the tires are taken into consideration, and made low level by only using a first component of torsional vibration of the drive shaft 39 and the tires, namely, the model shown in FIG. 2 is considered. An equation of motion for this model can be expressed using equation (3). Here, in equation 3, θ is a twist angle of the drive shaft 39, τE is torque of the engine 22, α is reduction ratio of the planetary gear 24 from the planetary carrier 32 to the sun gear 26.

$$\frac{d}{dt}\begin{bmatrix} \omega M' \\ \omega b \\ \theta \end{bmatrix} = \begin{bmatrix} a11 & -a11 & a13 \\ a21 & -a21 & a23 \\ 1 & -1 & 0 \end{bmatrix} \begin{bmatrix} \omega M' \\ \omega b \\ \theta \end{bmatrix} + \begin{bmatrix} b1 \\ 0 \\ 0 \end{bmatrix} (\tau M + a\tau E) \tag{3}$$

As shown in the control device 50 for an electric vehicle of FIG. 1, since input torque τM input to the electric motor 36 is represented using equation (4), an equation of state for a closed loop made up of the control system using equation (3) and equation (4) becomes equation (5), and a characteristic equation of this equation of state is expressed as equation (6) by using a laplace operator.

$$\tau M = \tau M\_ref - k(\omega M' - \omega b) \tag{4}$$

$$\frac{d}{dt}\begin{bmatrix} \omega M' \\ \omega b \\ \theta \end{bmatrix} = \begin{bmatrix} a11 - b1k & -a11 + b1k & a13 \\ a21 & -a21 & a23 \\ 1 & -1 & 0 \end{bmatrix} \begin{bmatrix} \omega M' \\ \omega b \\ \theta \end{bmatrix} + \tag{5}$$

$$\begin{bmatrix} b1 \\ 0 \\ 0 \end{bmatrix} (\tau M\_ref + a\tau E)$$

$$det\left(\begin{bmatrix} s & 0 & 0 \\ 0 & s & 0 \\ 0 & 0 & s \end{bmatrix} - \begin{bmatrix} a11 - b1k & -a11 + b1k & a13 \\ a21 & -a21 & a23 \\ 1 & -1 & 0 \end{bmatrix}\right) = \tag{6}$$

$$[s^2 + (-a11 + a21 + b1k)s + (a13 + a23)]s$$

Figure 3:
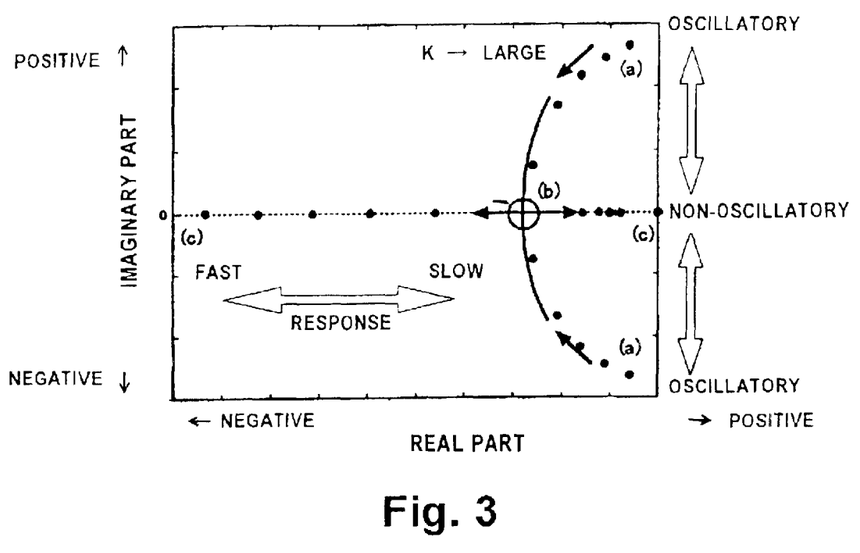
FIG. 3 is a drawing for describing a roof locus of a characteristic equation and a vibrational state.

When this characteristic equation becomes zero, s is a closed loop pole, and can be expressed using equation 7. A roof locus is shown in FIG. 3.

$$s = 0, \frac{-(-a11 + a21 + b1k) \pm \sqrt{(-a11 + a21 + b1k)^2 - 4(a13 + a23)}}{2} \tag{7}$$

Since the second term on the right side of equation (7) is a conjugate complex pole, it is clear that a dynamic component is included. In making this pole non-oscillatory, it is only necessary to set the gain k so that the second term on the right of equation (7) becomes a real number. If the gain k is varied from zero to infinity, then as shown in FIG. 3 the closed loop pole moves from the complex conjugate poles (a) in the drawing, through an equal root (b) to an infinite distance and the origin of (c), and so it will be understood that gain giving a closed loop pole a real number exists. That is, if the gain k is set so that the closed loop pole becomes (b) or (c), it is possible to suppress vibration. Gain k giving (b) or (c) exhibiting non-oscillatory characteristics is set so that the value of the second term on the right of equation (7) becomes a real number. That is, the gain k is set to a value for equation (1) satisfying equation (8).

$$(-a11 + a21 + b1k)^2 - 4(a13 + a23) \geq 0 \tag{8}$$

Of (b) or (c) exhibiting non-oscillatory characteristics, response is fastest when (b) has an equal root, and therefore gain k that also takes responsiveness into consideration is obtained by solving equation (9) with the second term on the right of equation (7) set to 0. There are two solutions for equation (9), but one is excluded because k<0 and constitutes negative feedback, and a value obtained from equation (1) with k>0 is adopted as gain k.

$$(-a11 + a21 + b1k)^2 - 4(a13 + a23) = 0 \tag{9}$$

Figure 4:
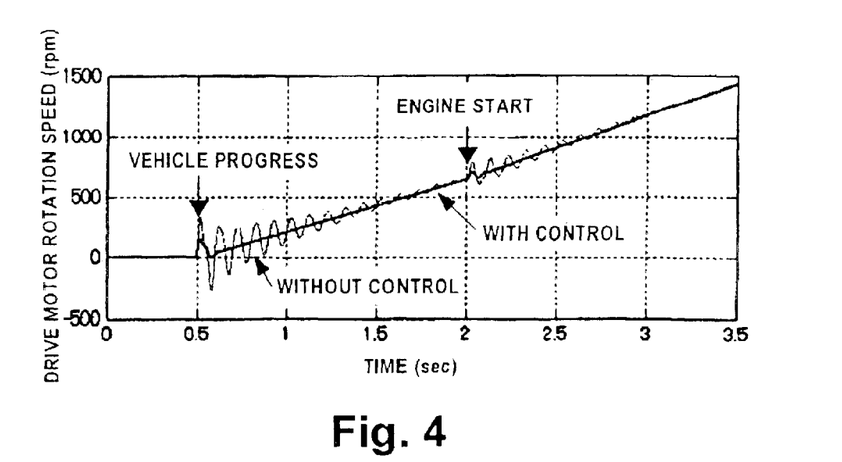
FIG. 4 is a drawing for explaining one example of variation in rotational speed of an electric motor 36 for a case where control using a controller 50 for an electric automobile of this embodiment is applied, and the case where the controller 50 is not applied.

At the time of departure, the vehicle only moves under torque from the electric motor 36, and when specified conditions have been satisfied the engine 22 is started, and one example of variation in rotational speed of the electric motor 36 for travel under torque from the engine 22 and the electric motor 36 in the case where control using the control device 50 is adopted and the case where control using the control device 50 is not adopted is shown in FIG. 4. As shown in FIG. 4, by adopting control using the control device 50 for an electric vehicle of this embodiment, it will be understood that it is possible to favorably suppress vibration of the rotational speed of the electric motor 36, namely vibration of the vehicle.

According to the above described control device 50 for an electric vehicle of this embodiment, it is possible to favorably suppress vehicle vibration. Also, since feedback control is performed using only the rotational speed of the electric motor 36 and average rotational speed of the drive wheels 42 and 44, it is possible to reduce the amount of computation. As a result, it is also possible to use a CPU having a slow operation speed.

Figure 5:
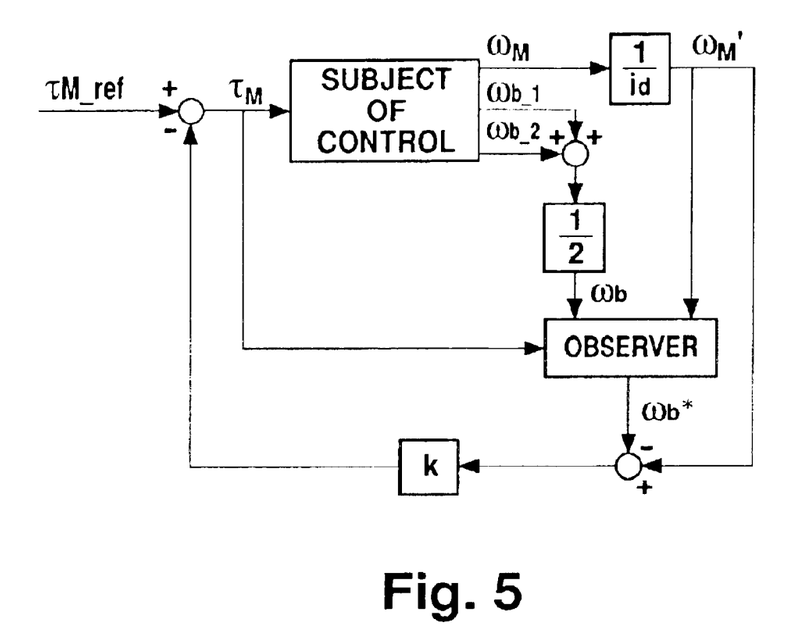
FIG. 5 is a block diagram illustrating a control block of a modified example.
Figure 6:
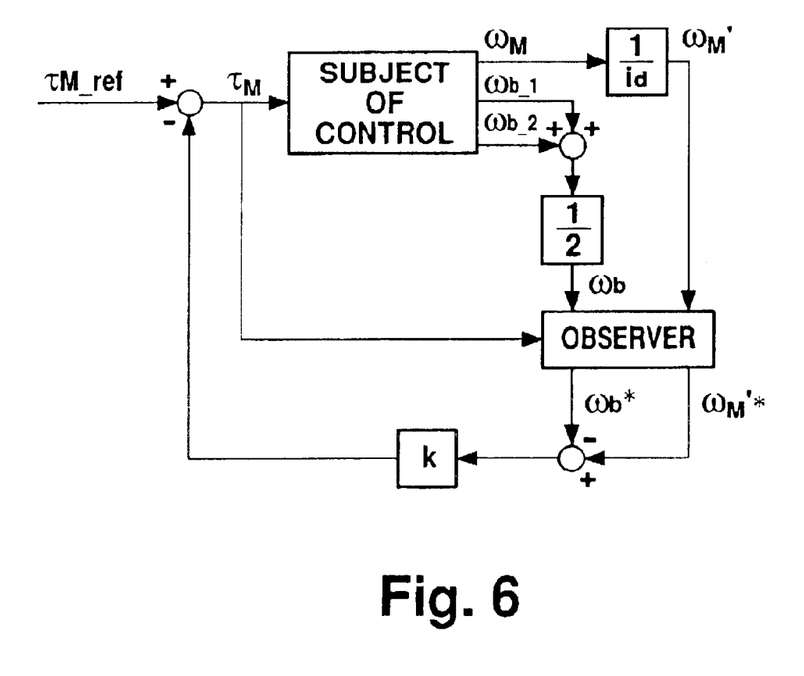
FIG. 6 is a block diagram illustrating a control block of a modified example.

With the control device 50 for an electric vehicle of this embodiment, control is carried out using the rotational speed $\omega M$ of the electric motor 36 detected by the electric motor rotation speed sensor 52 and the average rotation speed $\omega b$ of the drive wheels 42 and 44 detected by the drive wheel rotational speed sensor 54. When the resolution of the drive wheel rotational speed sensor 54 is coarse, it is possible to use feedback control where average rotation speed $\omega b^*$ of the drive wheels 42 and 44 is estimated with high precision using an observer represented by equation (10), as shown in the control block of the modified example of FIG. 5. In equation (10), "*" represents an estimated value, and $F_o xx$ is observer gain. With respect to "*" and $F_o xx$, they are the same in the following equations. When this type of observer is used, it is possible to us an estimated value $\omega M'^*$ of the rotational speed of the electric motor 36.

$$\frac{d}{dt}\begin{bmatrix} \omega M'* \\ \omega b* \\ \theta* \end{bmatrix} = \begin{bmatrix} a11 & -a11 & a13 \\ a21 & -a21 & a23 \\ 1 & -1 & 0 \end{bmatrix}\begin{bmatrix} \omega M'* \\ \omega b* \\ \theta* \end{bmatrix} + \begin{bmatrix} b1 \\ 0 \\ 0 \end{bmatrix}\tau M + \begin{bmatrix} F_0 11 & F_0 21 \\ F_0 12 & F_0 22 \\ F_0 13 & F_0 23 \end{bmatrix}\begin{bmatrix} \omega M' - \omega M'* \\ \omega b - \omega b* \end{bmatrix} \quad (10)$$

Figure 7:
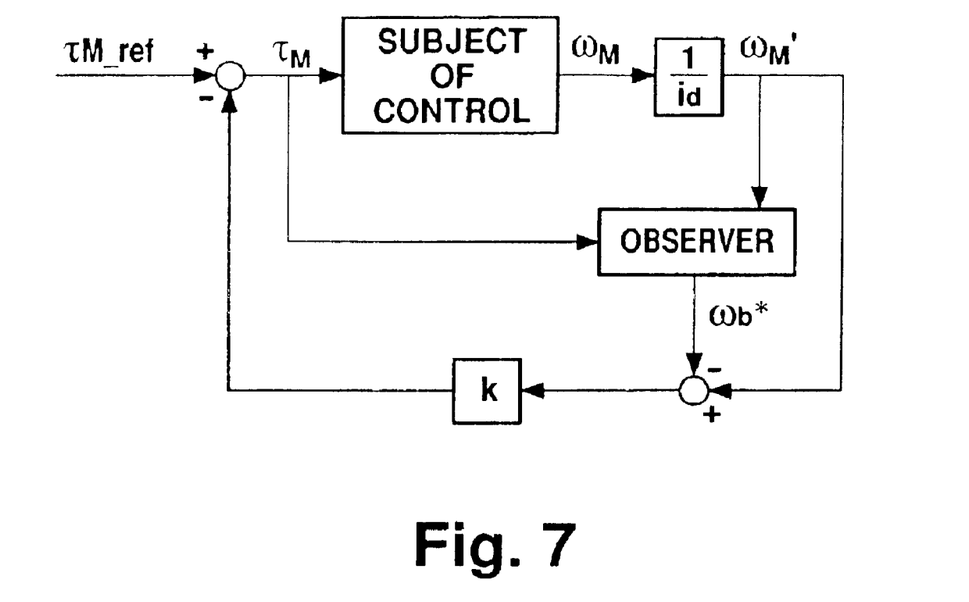
FIG. 7 is a block diagram illustrating a control block of a modified example.
Figure 8:
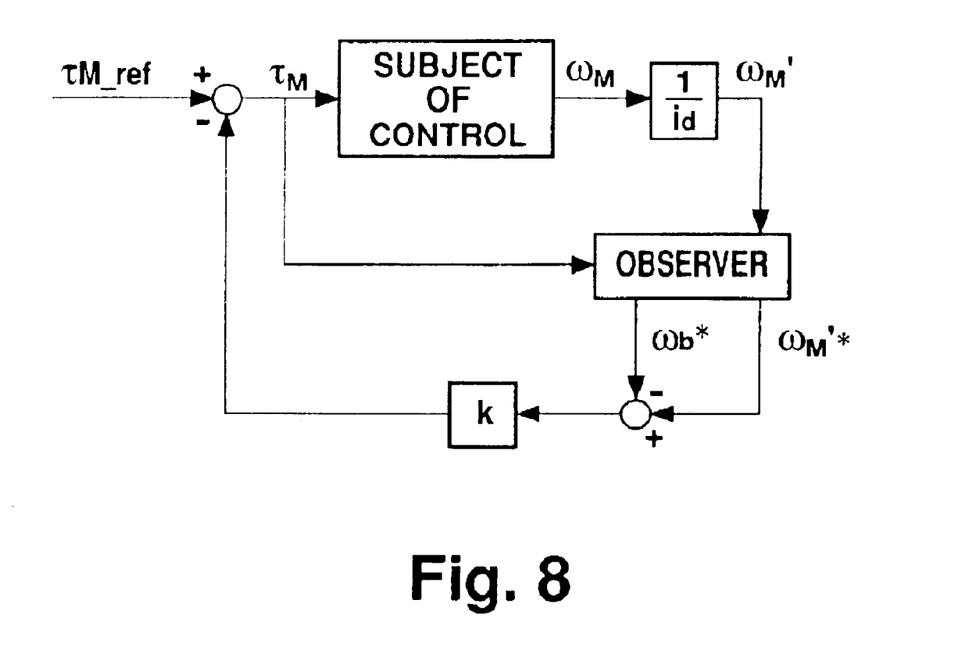
FIG. 8 is a block diagram illustrating a control block of a modified example.

It is also possible, instead of using the drive wheel rotational speed sensor 54, to use feedback control, estimating the average rotational speed $\omega b^*$ of the drive wheels 42 and 44 using an observer represented by equation (11), as shown in the control block of the modified example of FIG. 7. In this case, it is possible to use feedback control of an estimated value $\omega M'^*$ for the rotational speed of the electric motor 36, as shown in the control block of the modified example of FIG. 8.

$$\frac{d}{dt}\begin{bmatrix} \omega M'* \\ \omega b* \\ \theta* \end{bmatrix} = \begin{bmatrix} a11 & -a11 & a13 \\ a21 & -a21 & a23 \\ 1 & -1 & 0 \end{bmatrix}\begin{bmatrix} \omega M'* \\ \omega b* \\ \theta* \end{bmatrix} + \begin{bmatrix} b1 \\ 0 \\ 0 \end{bmatrix}\tau M + \begin{bmatrix} F_0 11 \\ F_0 12 \\ F_0 13 \end{bmatrix}(\omega M' - \omega M'*) \quad (11)$$

Figure 9:
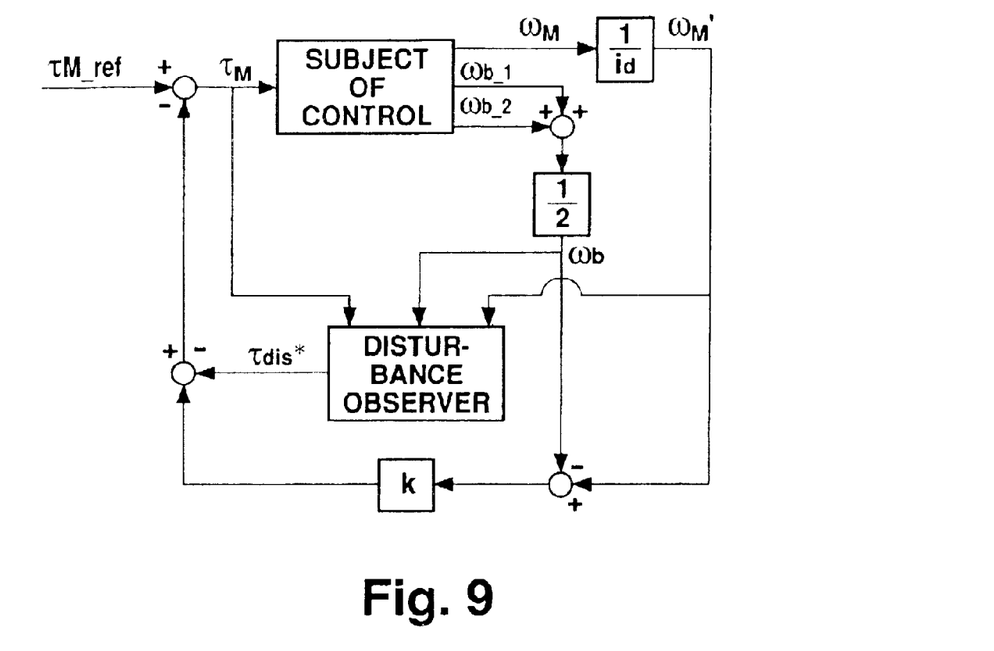
FIG. 9 is a block diagram illustrating a control block of a modified example.
Figure 10:
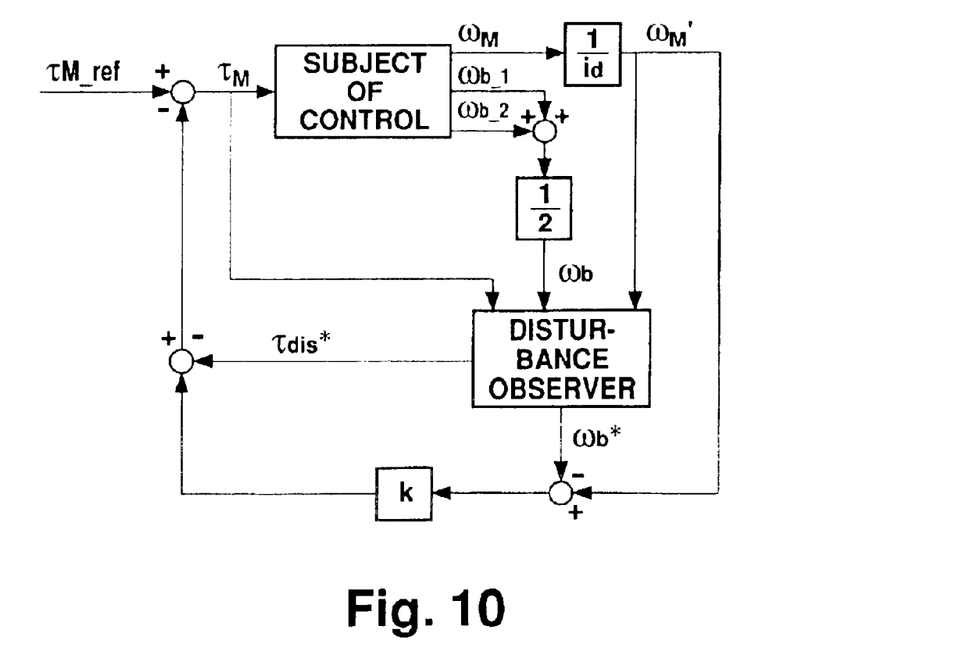
FIG. 10 is a block diagram illustrating a control block of a modified example.
Figure 11:
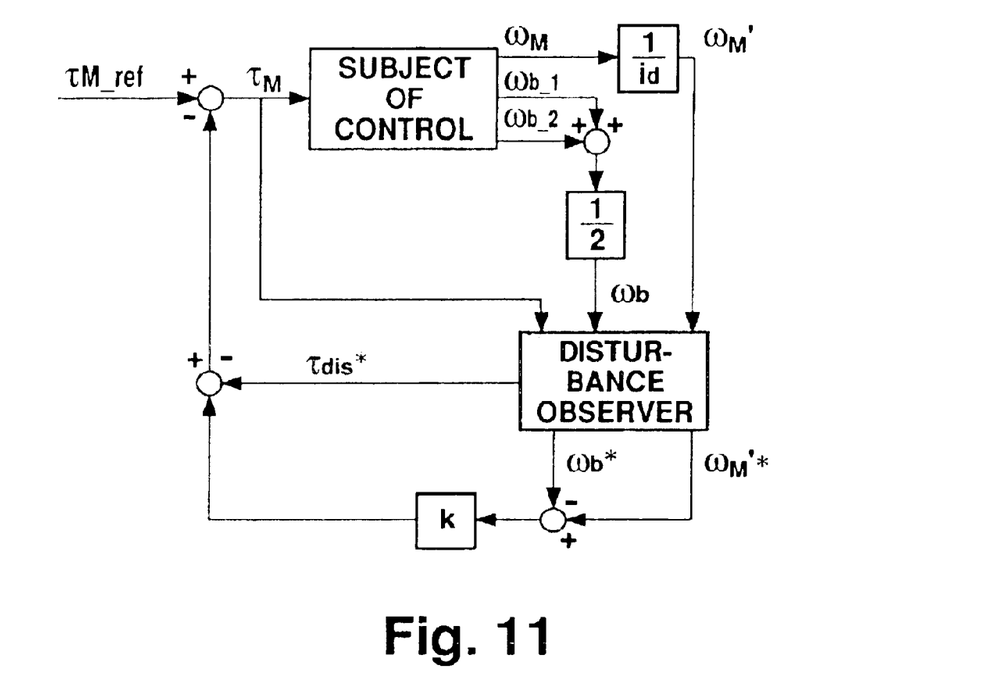
FIG. 11 is a block diagram illustrating a control block of a modified example.
Figure 12:
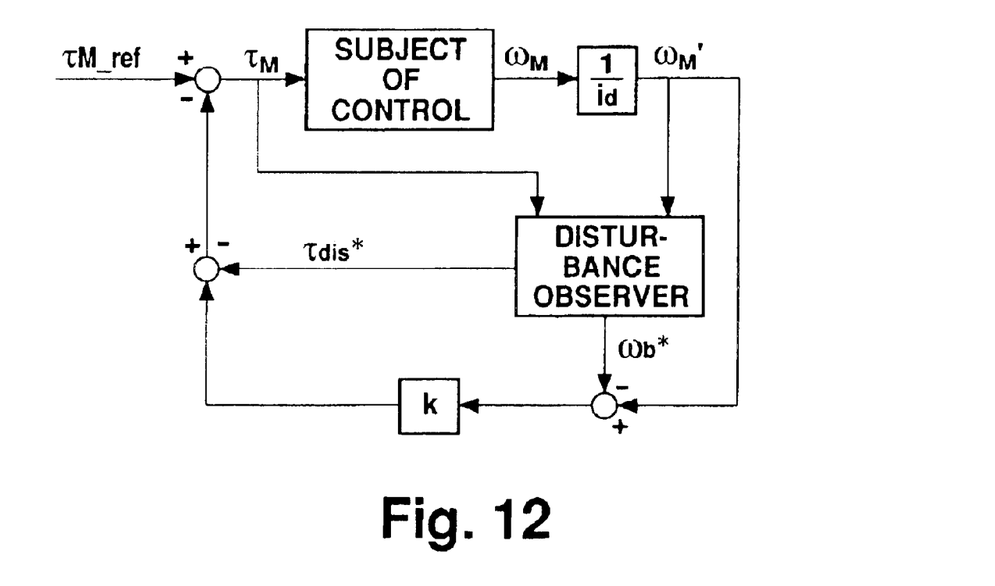
FIG. 12 is a block diagram illustrating a control block of a modified example.
Figure 13:
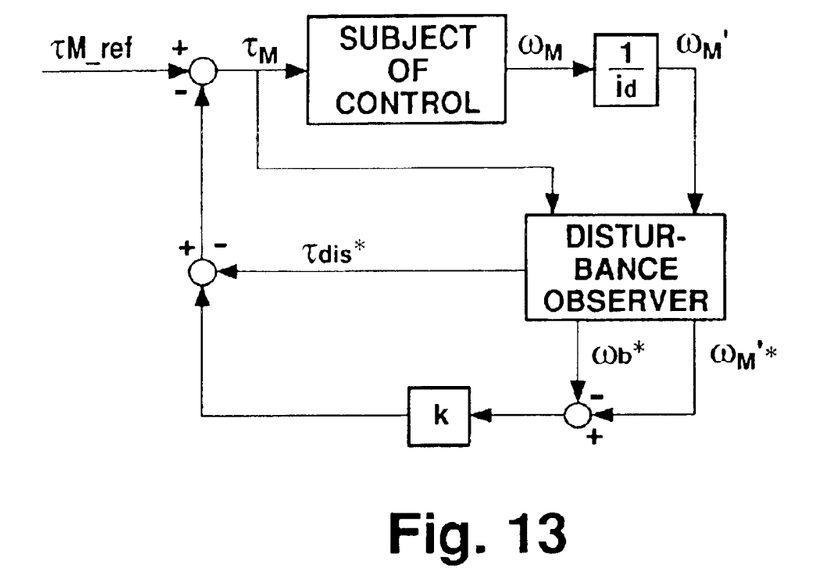
FIG. 13 is a block diagram illustrating a control block of a modified example.

With control using these observers, since estimation is based on the numerical model represented by equation (3), there are sometimes cases where a parameter value within the numerical expression is different from a value for an actual system, and in that case favorable control can not be performed. There is also a possibility of errors being contained in the structure of the model itself because a low level model is being used, and in this case also, it is not possible to perform favorable control. Instead of the observers shown in the control blocks of the modified examples shown in FIG. 1 and FIG. 5 to FIG. 8, it is possible to use the disturbance observers as shown in the control blocks of the modified example shown in FIG. 9 to FIG. 13. In this case, it is possible to use equation (12) and equation (13) in place of equation (10) and equation (11) described above. Here, equation (12) is for disturbance observers for the case where the drive wheel rotational speed sensor 54 is used corresponding to the control block of the modified examples of FIG. 9 to FIG. 11, and equation (13) is for disturbance observers for the case where it is not possible to detect average rotational speed $\omega b$ of the drive wheels 42 and 44 corresponding to the control blocks of the modified examples of FIG. 11 and FIG. 12. Also, in equation (12) and equation (13), $\tau dis^*$ is estimated disturbance.

$$\frac{d}{dt}\begin{bmatrix} \omega M'* \\ \omega b* \\ \theta* \\ \tau dis* \end{bmatrix} = \begin{bmatrix} a11 & -a11 & a13 \\ a21 & -a21 & a23 \\ 1 & -1 & 0 \\ 0 & 0 & 0 \end{bmatrix}\begin{bmatrix} \omega M'* \\ \omega b* \\ \theta* \\ \tau dis* \end{bmatrix} + \begin{bmatrix} b1 \\ 0 \\ 0 \\ 0 \end{bmatrix}\tau M + \begin{bmatrix} F_0 11 & F_0 21 \\ F_0 12 & F_0 22 \\ F_0 13 & F_0 23 \\ F_0 14 & F_0 24 \end{bmatrix}\begin{bmatrix} \omega M' - \omega M'* \\ \omega b - \omega b* \end{bmatrix} \quad (12)$$

$$\frac{d}{dt}\begin{bmatrix} \omega M'* \\ \omega b* \\ \theta* \\ \tau dis* \end{bmatrix} = \begin{bmatrix} a11 & -a11 & a13 \\ a21 & -a21 & a23 \\ 1 & -1 & 0 \\ 0 & 0 & 0 \end{bmatrix}\begin{bmatrix} \omega M'* \\ \omega b* \\ \theta* \\ \tau dis* \end{bmatrix} + \begin{bmatrix} b1 \\ 0 \\ 0 \\ 0 \end{bmatrix}\tau M + \begin{bmatrix} F_0 11 \\ F_0 12 \\ F_0 13 \\ F_0 14 \end{bmatrix}(\omega M' - \omega M'*) \quad (13)$$

Figure 14:
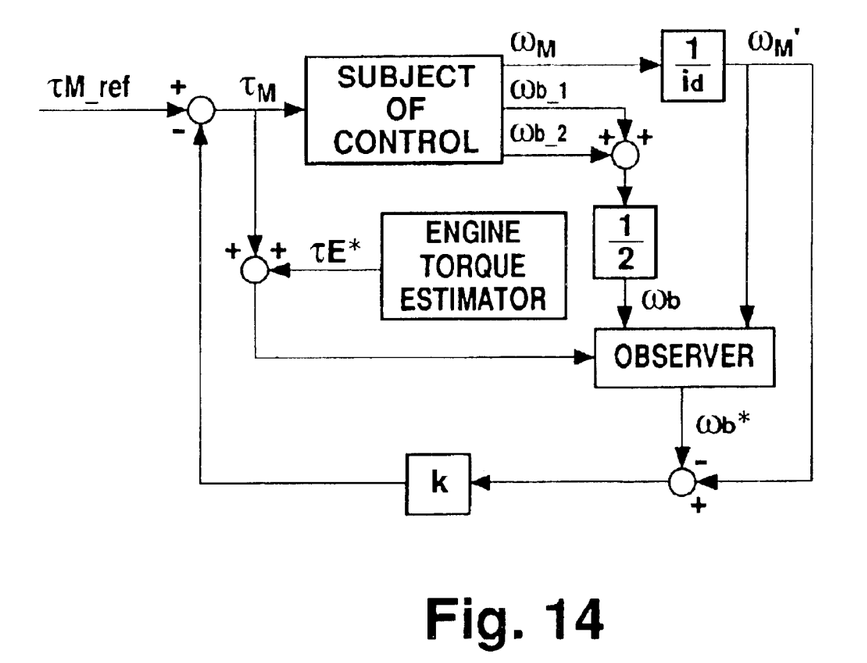
FIG. 14 is a block diagram illustrating a control block of a modified example.
Figure 15:
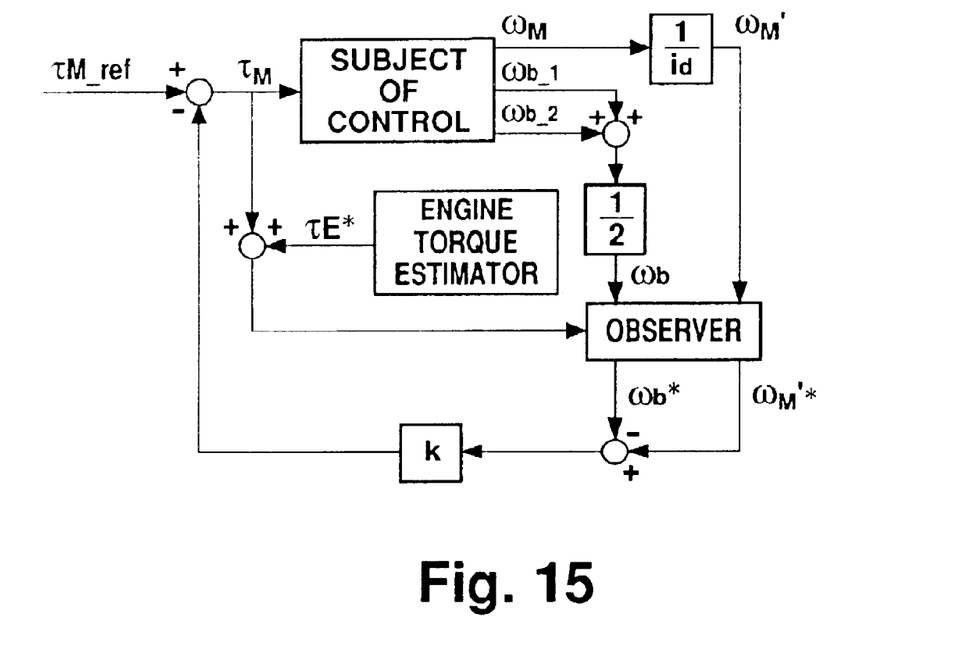
FIG. 15 is a block diagram illustrating a control block of a modified example.

With a hybrid electric vehicle such as the electric vehicle 20 of this embodiment, as shown in the control block of the modified example of FIG. 14 and FIG. 15, it is possible to use estimated torque $\tau E^*$ of the engine 22 in the observer. The observer in this case can be expressed as shown in equation 14. Here, there are various types of estimator that can be used as the engine torque estimator, such as an estimator for estimating estimation torque $\tau E^*$ using an equation of motion from rotational speed $\omega E$ of the engine 22, rotational speed $\omega M$ of the electric motor 36, rotational speed $\omega G$ of the generator 34 and torque of the electric motor 36, an estimator for estimating estimation torque $\tau E^*$ from a function of accelerator opening amount and rotation speed $\omega E$ of the engine 22, an estimator for estimating estimation torque $\tau E^*$ from cylinder pressure of the engine 22, or an estimator for estimating estimation torque $\tau E^*$ from intake air amount of the engine 22 and rotational speed $\omega E$ of the engine 22.

$$\frac{d}{dt}\begin{bmatrix} \omega M'* \\ \omega b* \\ \theta* \end{bmatrix} = \begin{bmatrix} a11 & -a11 & a13 \\ a21 & -a21 & a23 \\ 1 & -1 & 0 \end{bmatrix}\begin{bmatrix} \omega M'* \\ \omega b* \\ \theta* \end{bmatrix} + \quad (14)$$

$$\begin{bmatrix} b1 \\ 0 \\ 0 \end{bmatrix}(\tau M + a\tau E*) + \begin{bmatrix} F_011 & F_021 \\ F_012 & F_022 \\ F_013 & F_023 \end{bmatrix}\begin{bmatrix} \omega M' - \omega M'* \\ \omega b - \omega b* \end{bmatrix}$$

Figure 16:
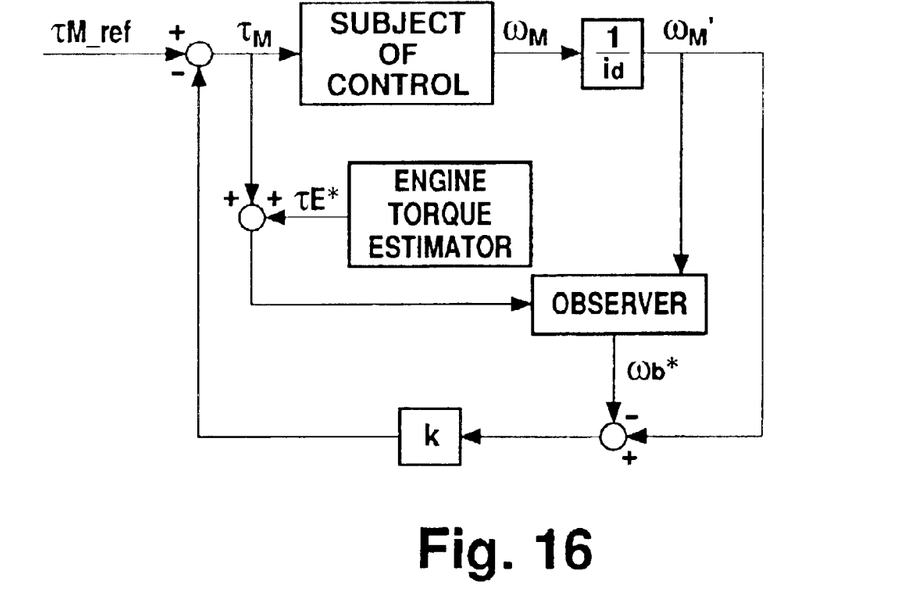
FIG. 16 is a block diagram illustrating a control block of a modified example.
Figure 17:
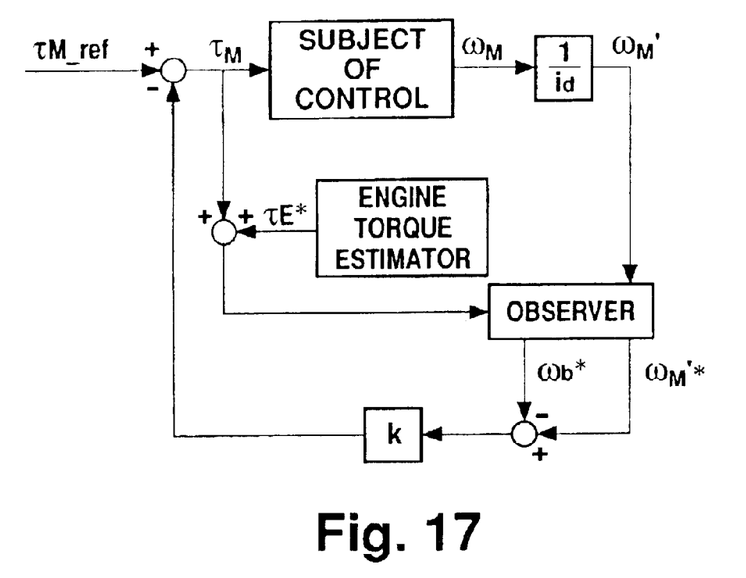
FIG. 17 is a block diagram illustrating a control block of a modified example.
Figure 18:
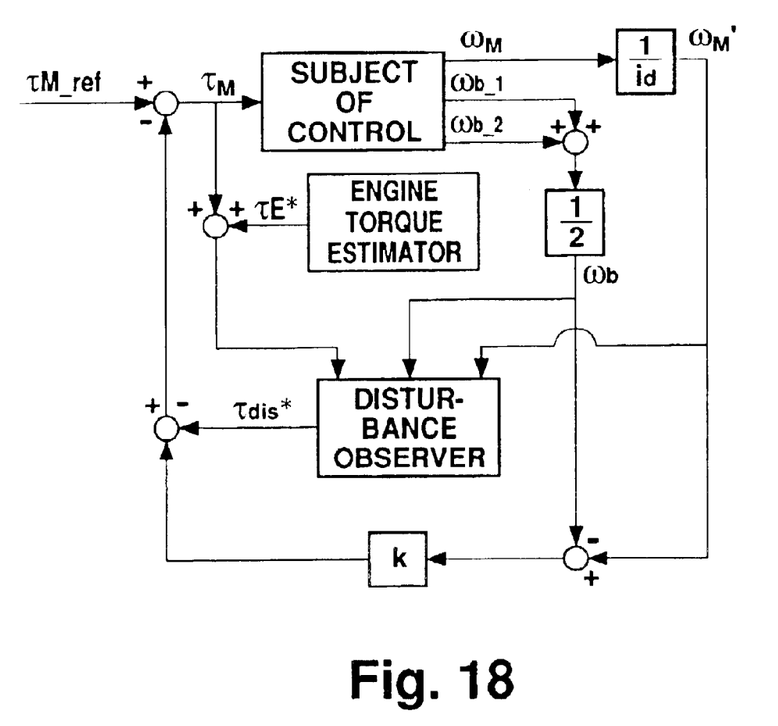
FIG. 18 is a block diagram illustrating a control block of a modified example.
Figure 19:
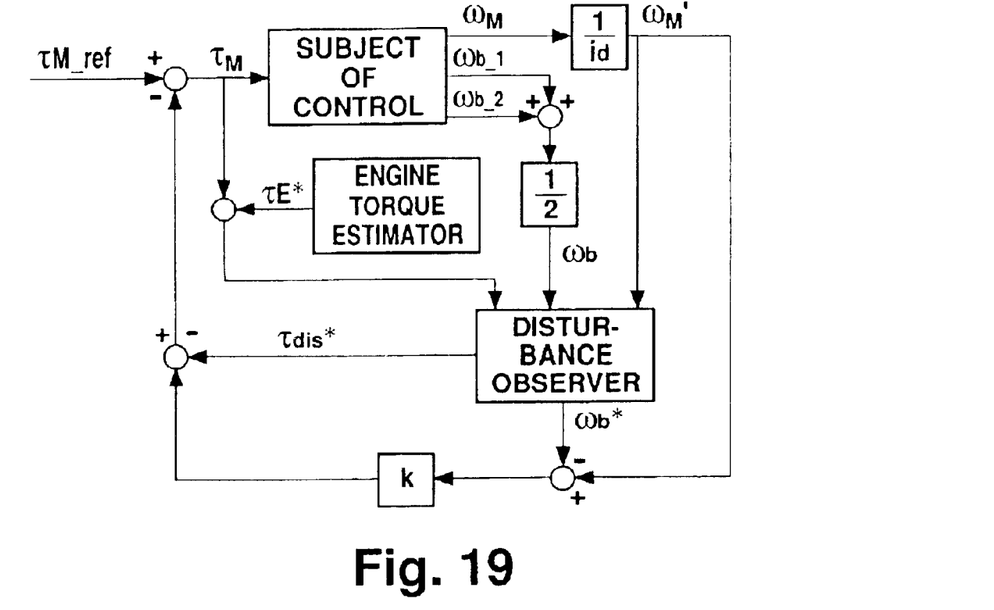
FIG. 19 is a block diagram illustrating a control block of a modified example.
Figure 20:
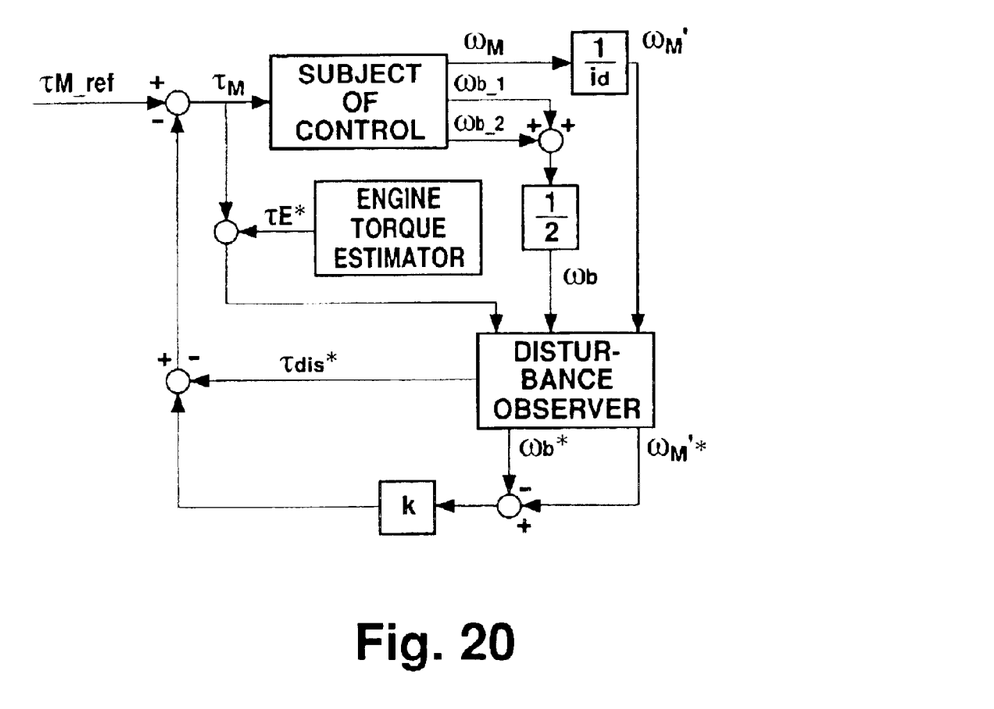
FIG. 20 is a block diagram illustrating a control block of a modified example.
Figure 21:
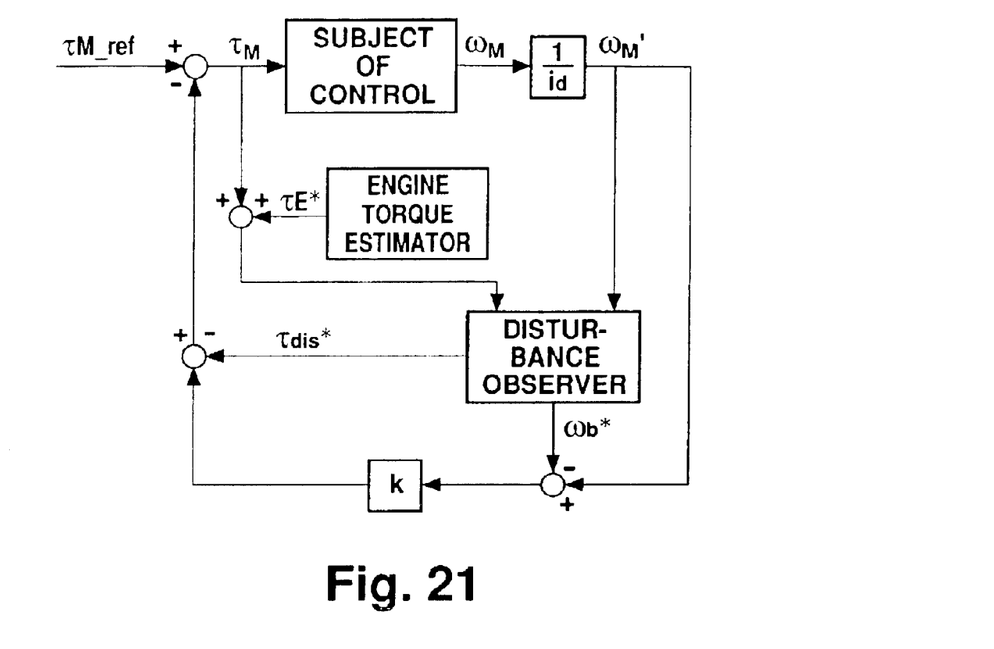
FIG. 21 is a block diagram illustrating a control block of a modified example.
Figure 22:
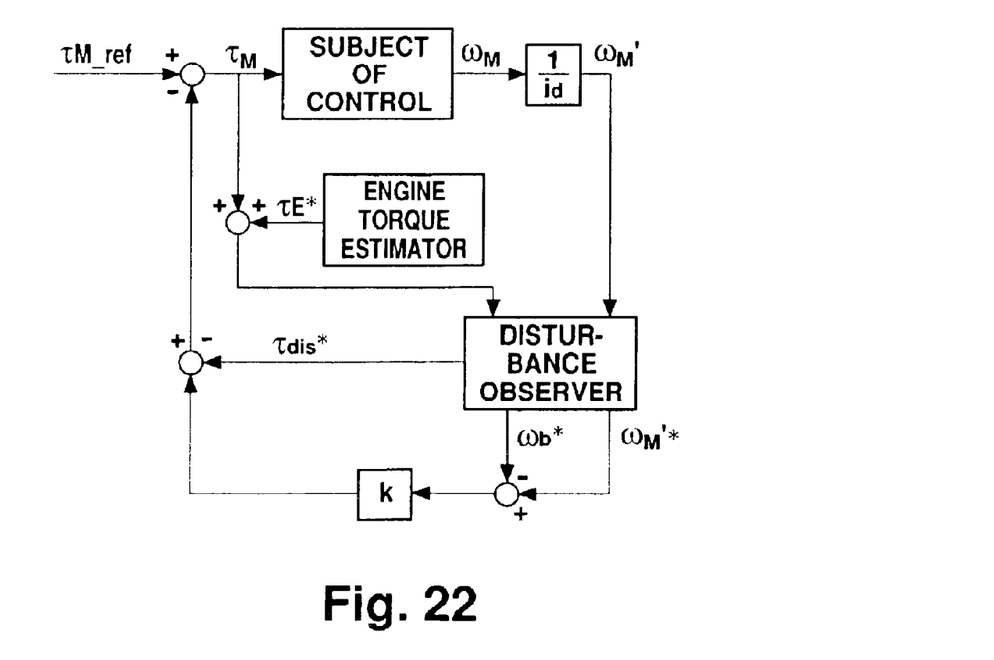
FIG. 22 is a block diagram illustrating a control block of a modified example.

Also, in the event that it is not possible to detect the average rotational speed ωb of the drive wheels 42 and 44, it is possible to use the observer represented by equation (15), as shown in the control block of the modified examples of FIG. 16 and FIG. 17.

$$\frac{d}{dt}\begin{bmatrix} \omega M'* \\ \omega b* \\ \theta* \end{bmatrix} = \begin{bmatrix} a11 & -a11 & a13 \\ a21 & -a21 & a23 \\ 1 & -1 & 0 \end{bmatrix}\begin{bmatrix} \omega M'* \\ \omega b* \\ \theta* \end{bmatrix} + \qquad(15)$$

$$\begin{bmatrix} b1 \\ 0 \\ 0 \end{bmatrix}(\tau M + a\tau E*) + \begin{bmatrix} F_011 \\ F_012 \\ F_013 \end{bmatrix}(\omega M' - \omega M'*)$$

It is also possible to use a disturbance observer represented by equation (16) and equation (17), as shown in the control block of the modified examples of FIG. 18 to FIG. 22. Equation (16) is for disturbance observers for the case where the drive wheel rotational speed sensor 54 is used corresponding to the control block of the modified examples of FIG. 18 to FIG. 20, and equation (17) is for disturbance observers for the case where it is not possible to detect average rotational speed ωb of the drive wheels 42 and 44 corresponding to the control blocks of the modified examples of FIG. 21 and FIG. 22.

$$\frac{d}{dt}\begin{bmatrix} \omega M'* \\ \omega b* \\ \theta* \\ \tau dis* \end{bmatrix} = \begin{bmatrix} a11 & -a11 & a13 \\ a21 & -a21 & a23 \\ 1 & -1 & 0 \\ 0 & 0 & 0 \end{bmatrix}\begin{bmatrix} \omega M'* \\ \omega b* \\ \theta* \\ \tau dis* \end{bmatrix} + \qquad(16)$$

$$\begin{bmatrix} b1 \\ 0 \\ 0 \\ 0 \end{bmatrix}(\tau M + a\tau E*) + \begin{bmatrix} F_011 & F_021 \\ F_012 & F_022 \\ F_013 & F_023 \\ F_014 & F_024 \end{bmatrix}\begin{bmatrix} \omega M' - \omega M'* \\ \omega b - \omega b* \end{bmatrix}$$

$$\frac{d}{dt}\begin{bmatrix} \omega M'* \\ \omega b* \\ \theta* \\ \tau dis* \end{bmatrix} = \begin{bmatrix} a11 & -a11 & a13 \\ a21 & -a21 & a23 \\ 1 & -1 & 0 \\ 0 & 0 & 0 \end{bmatrix}\begin{bmatrix} \omega M'* \\ \omega b* \\ \theta* \\ \tau dis* \end{bmatrix} + \qquad(17)$$

$$\begin{bmatrix} b1 \\ 0 \\ 0 \\ 0 \end{bmatrix}(\tau M + a\tau E*) + \begin{bmatrix} F_011 \\ F_012 \\ F_013 \\ F_014 \end{bmatrix}(\omega M' - \omega M'*)$$

The control device 50 for an electric vehicle of this embodiment is mounted in an electric vehicle 20 capable of outputting torque from an engine 22 and a electric motor 36 to a drive shaft 39, but with the equation of motion of equation (3), since the moment of inertia J1 of the electric motor 36 is taken into consideration, including consideration of the moment of inertia of the generator 34 and the engine 22 connected to the planetary gear 24, it is clear that it is also possible to mount the control device 50 of this embodiment in an electric vehicle that is not provided with an engine 22 or a generator 34, and to carry out control to suppress vibration. In this case, the electric motor 36 does not need to be connected through the reduction gear 38 to the drive shaft 39, and it is possible to connect directly to the drive shaft 39.

The present invention has been described above using embodiments, but the present invention is not thus limited and various modifications are possible within the spirit and scope of the appended claims.

What is claimed is:

1. A control unit of the present invention for an electric vehicle capable of being driven using torque from an electric motor generated in response to a torque instruction, comprising:
   an electric motor rotation speed detection and estimation unit for detecting or estimating rotation speed of the electric motor,
   a drive wheel rotation speed detection and estimation unit for detecting or estimating rotation speed of drive wheels, and
   a torque instruction compensation unit for compensating the torque instruction so as to control vibration of the vehicle based on rotational speed of the electric motor detected or estimated by the electric motor rotation speed detection and estimation unit and drive wheel rotation speed detected or estimated by the drive wheel rotation speed detection and estimation unit.

2. The electric vehicle control unit of claim 1, wherein the torque instruction compensation unit has a unit for compensating the torque by subtracting a compensation value, obtained by multiplying a rotational speed difference, between rotational speed of the drive wheels computed from detected or estimated electric motor rotation speed and the detected or estimated drive wheel rotation speed, by a specified gain, from the torque instruction.

3. The electric vehicle control; unit of claim 2, wherein the specified gain is determined so that poles of a characteristic equation, for an equation of motion for the drive system of the electric vehicle, with the electric motor rotational speed, the drive wheel rotational speed and a drive shaft twist angle as variables, and an equation of state for the control system using electric motor input torque, obtained by subtracting the rotational speed deviation, multiplied by the gain, from the torque instruction, become real numbers.

4. The electric vehicle control unit of claim 1, wherein the drive wheel rotation speed detection and estimation unit has a unit for estimating rotation speed of the drive wheels based on at least rotational speed of the electric motor and the compensated torque instruction input to the control system.

5. The electric vehicle control unit of claim 2, wherein the drive wheel rotation speed detection and estimation unit has a unit for estimating rotation speed of the drive wheels based on at least rotational speed of the electric motor and the compensated torque instruction input to the control system.

6. The electric vehicle control unit of claim 3, wherein the drive wheel rotation speed detection and estimation unit has a unit for estimating rotation speed of the drive wheels based on at least rotational speed of the electric motor and the compensated torque instruction input to the control system.

7. The electric vehicle control unit of claim 4, wherein the electric motor rotation speed detection and estimation unit has a unit for estimating rotation speed of the electric motor based on at rotational speed of the electric motor detected at low resolution and the compensated torque instruction input to the control system.

8. The electric vehicle control unit of claim 5, wherein the electric motor rotation speed detection and estimation unit has a unit for estimating rotation speed of the electric motor based on at rotational speed of the electric motor detected at low resolution and the compensated torque instruction input to the control system.

9. The electric vehicle control unit of claim 6, wherein the electric motor rotation speed detection and estimation unit has a unit for estimating rotation speed of the electric motor based on at rotational speed of the electric motor detected at low resolution and the compensated torque instruction input to the control system.

10. The electric vehicle control unit of claim 1, comprising a disturbance estimation unit for estimating disturbance based on, the torque instruction compensated by the torque instruction compensation unit, rotation speed of the drive wheels computed from detected or estimated rotation speed of the electric motor, and detected or estimated drive wheel rotation speed, the torque instruction compensation unit having a unit for compensating the torque instruction based on disturbance estimated by the disturbance estimation unit.

11. The electric vehicle control unit of claim 2, comprising a disturbance estimation unit for estimating disturbance based on, the torque instruction compensated by the torque instruction compensation unit, rotation speed of the drive wheels computed from detected or estimated rotation speed of the electric motor, and detected or estimated drive wheel rotation speed, the torque instruction compensation unit having a unit for compensating the torque instruction based on disturbance estimated by the disturbance estimation unit.

12. The electric vehicle control unit of claim 3, comprising a disturbance estimation unit for estimating disturbance based on, the torque instruction compensated by the torque instruction compensation unit, rotation speed of the drive wheels computed from detected or estimated rotation speed of the electric motor, and detected or estimated drive wheel rotation speed, the torque instruction compensation unit having a unit for compensating the torque instruction based on disturbance estimated by the. disturbance estimation unit.

13. The electric vehicle control unit of claim 4, wherein the electric vehicle is a hybrid electric vehicle provided with an internal combustion engine and capable of also being driven using torque from the internal combustion engine, the electric vehicle control unit further comprising an output torque estimation unit for estimating output torque of the internal combustion engine, and the drive wheel rotation speed detection and estimation unit having a unit for estimating rotation speed of drive wheels based on output torque estimated by the output torque estimation unit.

14. The electric vehicle control unit of claim 7, wherein the electric vehicle is a hybrid electric vehicle provided with an internal combustion engine and capable of also being driven using torque from the internal combustion engine, the electric vehicle control unit further comprising an output torque estimation unit for estimating output torque of the internal combustion engine, and the drive wheel rotation speed detection and estimation unit having a unit for estimating rotation speed of drive wheels based on output torque estimated by the output torque estimation unit.

15. The electric vehicle control unit of claim 10, wherein the electric vehicle is a hybrid electric vehicle provided with an internal combustion engine and capable of also being driven using torque from the internal combustion engine, the electric vehicle control unit further comprising an output torque estimation unit for estimating output torque of the internal combustion engine, and the drive wheel rotation speed detection and estimation unit having a unit for estimating rotation speed of drive wheels based on output torque estimated by the output torque estimation unit.

16. The electric vehicle control unit of claim 14, wherein the electric motor rotation speed detection and estimation unit has a unit for estimating electric motor rotation speed based on output torque estimated by the output torque estimation unit.

17. The electric vehicle control unit of claim 15, wherein the disturbance estimation unit has a unit for estimating disturbance based on output torque estimated by the output torque estimation unit.

18. A control method for an electric vehicle capable of being driven using torque from an electric motor generated in response to a torque instruction, comprising the steps of:

(a) detecting or estimating electric motor rotation speed and drive wheel rotation speed; and (b) compensating a torque instruction for the electric motor so as to suppress vehicle vibration based on the detected or estimated electric motor rotation speed and drive wheel rotation speed.

19. The control method for an electric vehicle of claim 18, wherein step (b) is a step of compensating the torque instruction by subtracting a compensation value, obtained by multiplying a rotational speed deviation between rotational speed of the drive wheels computed from detected or estimated rotational speed of the electric motor and detected or estimated drive wheel rotational speed by a specified gain, from the torque instruction.

20. The control method for an electric vehicle of claim 19, wherein step (b) is a step of using a gain determined so that poles of a characteristic equation for an equation of motion for the drive system of the electric vehicle, with the electric motor rotational speed, the drive wheel rotational speed and a drive shaft twist angle as variables, and an equation of state for the control system using electric motor input torque obtained by subtracting the rotational speed deviation, multiplied by the gain, from the torque instruction, become real numbers, as the specified gain.

* * * * *